United States Patent
Horio et al.

(10) Patent No.: US 11,169,303 B2
(45) Date of Patent: Nov. 9, 2021

(54) OPTICAL LAYERED BODY AND IMAGE DISPLAY DEVICE

(71) Applicant: DAI NIPPON PRINTING CO., LTD., Tokyo (JP)

(72) Inventors: Tomoyuki Horio, Tokyo (JP); Masayuki Tsunekawa, Tokyo (JP); Seiichi Isojima, Tokyo (JP); Kana Yamamoto, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 785 days.

(21) Appl. No.: 14/369,514

(22) PCT Filed: Dec. 14, 2012

(86) PCT No.: PCT/JP2012/082549
§ 371 (c)(1),
(2) Date: Jun. 27, 2014

(87) PCT Pub. No.: WO2013/099658
PCT Pub. Date: Jul. 4, 2013

(65) Prior Publication Data
US 2015/0004397 A1    Jan. 1, 2015

(30) Foreign Application Priority Data
Dec. 28, 2011    (JP) .............................. JP2011-289352

(51) Int. Cl.
*G02B 1/10* (2015.01)
*G02B 1/16* (2015.01)

(52) U.S. Cl.
CPC .............. *G02B 1/10* (2013.01); *G02B 1/105* (2013.01); *G02B 1/16* (2015.01); *Y10T 428/256* (2015.01); *Y10T 428/31935* (2015.04)

(58) Field of Classification Search
CPC .. G02B 1/105; G02B 1/16; G02B 1/10; Y10T 428/256; Y10T 428/31935
See application file for complete search history.

(56) References Cited

U.S. PATENT DOCUMENTS

| | | | |
|---|---|---|---|
| 2007/0178297 A1* | 8/2007 | Takada | C08G 18/673 428/323 |
| 2007/0247710 A1* | 10/2007 | Nakashima | G02B 5/3025 359/487.05 |
| 2008/0014373 A1 | 1/2008 | Muramatsu et al. | |
| 2011/0045311 A1 | 2/2011 | Itoh | |
| 2012/0189828 A1 | 7/2012 | Inomata et al. | |
| 2012/0243115 A1 | 9/2012 | Takamiya et al. | |

FOREIGN PATENT DOCUMENTS

| | | |
|---|---|---|
| CN | 1993633 | 7/2007 |
| JP | 4-230906 | 8/1992 |
| JP | 2001-083327 | 3/2001 |
| JP | 2002-015631 | 1/2002 |
| JP | 2005-031282 | 2/2005 |
| JP | 2006-044257 | 2/2006 |
| JP | 2006-126808 | 5/2006 |
| JP | 2006-195413 | 7/2006 |
| JP | 2010-106061 | 5/2010 |
| JP | 2011-033948 | 2/2011 |
| JP | 2011-070170 | 4/2011 |
| JP | 2011-075939 | 4/2011 |
| KR | 10-2011-0025146 | 3/2011 |
| TW | 201125733 | 8/2011 |
| WO | 2011/016306 | 2/2011 |

* cited by examiner

*Primary Examiner* — Samir Shah
(74) *Attorney, Agent, or Firm* — Hamre, Schumann, Mueller & Larson, P.C.

(57) ABSTRACT

Provided is an optical layered body which is extremely high in the stability of the antistatic performance, and has a stable surface resistance even after a durability test. The optical layered body includes an antistatic layer on one face of a light-transmitting substrate, wherein the antistatic layer is formed using a composition for an antistatic layer containing conductive fine particles, a resin component, and a solvent, and the resin component has no reactive functional groups in a molecule, and is soluble in the solvent and compatible with the conductive fine particles.

10 Claims, No Drawings

OPTICAL LAYERED BODY AND IMAGE DISPLAY DEVICE

TECHNICAL FIELD

The present invention relates to an optical layered body and an image display device.

BACKGROUND ART

Image display devices such as cathode ray tube (CRT) display devices, liquid crystal displays (LCD), plasma display panels (PDP), electroluminescence displays (ELD), field emission displays (FED), or touch panels are provided with an optical layered body on the outermost surface. Such an optical layered body includes functional layers having various functions such as anti-reflective properties, hardening properties, or transparency.

The substrates of the functional layers are formed from, for example, an acrylic resin which is excellent in transparency and hardness. Such substrates of the functional layers, however, are easily charged because of their high insulating property, and are thus susceptible to dirt due to adhesion of dust, for example. Moreover, charged substrates cause failures not only in production processes but also in use of displays.

In order to avoid charging, a conventional optical layered body partially includes an antistatic layer containing a conductive antistatic agent (see, for example, Patent Literature 1, 2).

The antistatic functions of the antistatic agent to be added in the antistatic layer are conventionally classified into two types, namely, an electron conductive type in which an electron migrates via a carrier such as soliton or polaron, and an ion conductive type in which an ion itself migrates in a system.

Known examples of the antistatic agent of an electron conductive type include various metal oxides or conductive polymers. Known examples of the antistatic agent of an ion conductive type include quaternary ammonium salts and lithium salts.

Quaternary ammonium salts, which are cationic surfactants, have been preferably used as the antistatic agent to be added in the antistatic layer.

However, optical layered bodies provided with an antistatic layer including quaternary ammonium salts as an antistatic agent unfortunately may have an unstable surface resistance depending on the conditions for coating when the antistatic layer is formed. Moreover, optical layered bodies have been increasingly required to have extremely high durability (light resistance and heat resistance) these days. The stability of the surface resistance when an antistatic layer is formed is linked with the stability of the surface resistance of an optical layered body including the antistatic layer. Thus, the optical layered body provided with the antistatic layer including quaternary ammonium salts unfortunately has a surface resistance that is unstable before and after a durability test. Specifically, in the case of using an optical layered body provided with an antistatic layer for an electrostatic capacity touch panel, too low the surface resistance of the optical layered body after a durability test unfortunately leads to insufficient sensing by a touch sensor. Too high the surface resistance of the optical layered body after a durability test causes temporary concentration of electric charge on a touched part, which affects liquid crystal molecules. As a result, white turbidity occurs on the display screen in some cases.

Also known is the use of conductive polymers and conductive fine particles as antistatic agents to be added to antistatic layers. Unfortunately, an optical layered body provided with an antistatic layer including such an antistatic agent shows reduction in the surface resistance after a durability test.

CITATION LIST

Patent Literature

Patent Literature 1: JP 2006-126808 A
Patent Literature 2: JP 2005-31282 A

SUMMARY OF INVENTION

Technical Problem

In view of the current situation, the present invention aims to provide an optical layered body which is extremely high in the stability of the antistatic performance, and has a stable surface resistance that shows little change before and after a durability test. The present invention also aims to provide an image display device including the optical layered body.

Solution to Problem

That is, the present invention provides an optical layered body comprising: an antistatic layer on one face of a light-transmitting substrate, wherein the antistatic layer is formed using a composition for an antistatic layer containing conductive fine particles, a resin component, and a solvent, and the resin component has no reactive functional groups in a molecule, and is soluble in the solvent and compatible with the conductive fine particles.

The conductive fine particles in the optical layered body of the present invention preferably form chain-like aggregates or needle-like aggregates.

When durability test (1) to expose the optical layered body of the present invention to a condition at a temperature of 80° C. for 500 hours or durability test (2) to irradiate the optical layered body with xenon arc for 300 hours is made, variation in surface resistance through the durability test (1) or the durability test (2) represented by [(surface resistance after the test)/(surface resistance before the test)] is preferably within a range of 0.5 to 2.0.

The resin component preferably has a weight average molecular weight of 20,000 to 200,000, and a glass transition temperature of 80 to 120° C.

The resin component is preferably at least one selected from the group consisting of acrylic resins, cellulosic resins, urethane resins, vinyl chloride resins, polyester resins, polyolefin resins, polycarbonate, nylons, polystyrene, and ABS resins.

Preferably, the conductive fine particles are made of antimony-doped tin oxide (ATO), the resin component comprises polymethyl methacrylate, and the solvent comprises propylene glycol monomethyl ether.

The optical layered body of the present invention preferably further comprises a hard coat layer arranged on a face on an opposite side of the antistatic layer with respect to the light-transmitting substrate.

The hard coat layer preferably contains the same resin component as the antistatic layer.

The hard coat layer preferably contains electricity transmission fine particles.

The hard coat layer preferably contains an ultraviolet ray absorbent.

The amount of the ultraviolet ray absorbent is preferably 3 to 15% by mass in the hard coat layer.

The present invention also provides an image display device comprising the optical layered body of the present invention.

Details of the present invention are described below.

The present inventors made intensive studies on conventional optical layered bodies having unstable surface resistance after durability tests (light resistance test and heat resistance test). The inventors found that, in the conventional optical layered bodies, the antistatic agent in the antistatic layer moves and thus changes the position thereof before and after the durability tests, thereby causing the above problem. In order to solve the problem, the inventors made further studies, and found that an antistatic layer including a combination of specific materials shows a smaller change in the surface resistance before and after durability tests (light resistance test and heat resistance test). Accordingly, they completed the present invention.

The present invention provides an optical layered body including an antistatic layer on one face of a light-transmitting substrate.

In the optical layered body of the present invention, the antistatic layer is formed of a composition for an antistatic layer containing conductive fine particles, a resin component, and a solvent. That is, in the optical layered body of the present invention, the antistatic layer contains no monomer component.

The monomer component herein indicates a component which reacts in a durability test of the optical layered body, for example, a high temperature test at 80° C. and a durability test with a fade meter using carbon arc or a xenon weather meter using a xenon lump, to cause shrinkage on curing of an antistatic layer.

The antistatic layer in the optical layered body of the present invention contains no such monomer component. Thus, the antistatic layer does not shrink on curing after a durability test. Thus, the optical layered body has a stable surface resistance which does not change before and after a durability test.

Specifically, when durability test (1) to expose the optical layered body of the present invention to a condition at a temperature of 80° C. for 500 hours or durability test (2) to irradiate the optical layered body with xenon arc for 300 hours is made, variation in surface resistance through the durability test (1) or the durability test (2) represented by [(surface resistance after the test)/(surface resistance before the test)] is preferably within a range of 0.5 to 2.0. If the variation is less than 0.5, the optical layered body of the present invention has a low surface resistance and a high electrical conductivity after a durability test. In the case of using the optical layered body having such a surface resistance in an electrostatic capacity touch panel, the surface charge diffuses when the touch panel is touched with a finger. Thus, a sensor fails to sense the touching so that the touch sensor may not be activated. If the variation is more than 2.0, the optical layered body of the present invention has a high surface resistance and a low electrical conductivity after a durability test. In the case of using the optical layered body having such a surface resistance in an electrostatic capacity touch panel, the surface charge insufficiently diffuses when the touch panel is touched with a finger, causing temporary high charge concentration. This affects liquid crystal molecules so that white turbidity of the display screen may occur.

In the optical layered body of the present invention, an antistatic layer having no monomer component means not only the antistatic layer which does not contain any monomer component at all, but also the antistatic layer which contains monomer components in such an amount that the variation in the surface resistance before and after a durability test is within the above range.

The antistatic layer preferably does not contain resins which are degraded by ultraviolet rays. Examples of the resins which are degraded by ultraviolet rays include resins containing functional groups with large polarization, and resins having unsaturated bond in the main chain thereof.

The conductive fine particles are materials for ensuring the antistatic performance of the optical layered body of the present invention.

The conductive fine particles are not particularly limited, and conventionally known materials may be used. Examples thereof include metal fine particles, metal oxide fine particles, carbon nanotube, and coating fine particles. Among these, metal oxide fine particles are preferably used because of good light resistance, heat resistance, and environmental dependency.

Metals contained in the metal fine particles are not particularly limited, and examples thereof include Au, Ag, Cu, Al, Fe, Ni, Pd, and Pt.

Metal oxides contained in the metal oxide fine particles are not particularly limited, and examples thereof include tin oxide ($SnO_2$), antimony oxide ($Sb_2O_5$), antimony tin oxide (ATO), indium tin oxide (ITO), aluminum zinc oxide (AZO), fluorinated tin oxide (FTO), and ZnO. The term "metal oxide" herein refers to a concept including metal oxides in which dissimilar metals are doped.

The coating fine particles are not particularly limited, and examples thereof include conventionally known fine particles in which conductive coating layers are formed on the surfaces of core fine particles.

The core fine particles are not particularly limited, and examples thereof include inorganic fine particles such as silica fine particles or glass fine particles; polymer fine particles such as fluororesin fine particles, acrylic resin particles, or silicone resin fine particles; and organic-inorganic composite fine particles. Materials constituting the conductive coating layer are not particularly limited, and examples thereof include the aforementioned metals or alloys thereof, and the aforementioned metal oxides.

The conductive fine particles preferably have an average primary particle diameter of 6 to 40 nm. If the average primary particle diameter is less than 6 nm, a larger amount of the conductive fine particles need to be added to impart sufficient antistatic performance to the optical layered body of the present invention, which may deteriorate the transparency or adhesion between the antistatic layer and other layers. Moreover, an average primary particle diameter of less than 6 nm drastically increases the resistance of the conductive fine particles, which may deteriorate the conductivity of the antistatic layer. If the average primary particle diameter is more than 40 nm, the resistance of the conductive fine particles itself is low; however, the conductive fine particles are scattered in the antistatic layer so that favorable resistance may not be achieved. More preferably, the conductive fine particles have a minimum average primary particle diameter of 7 nm and a maximum average primary particle diameter of 20 nm.

Herein, the term "average primary particle diameter" of the conductive fine particles in the composition for an antistatic layer for forming the antistatic layer refers to a value measured with a MICROTRAC particle size analyzer (produced by Nikkiso Co., Ltd.), whereas that in the antistatic layer refers to an average diameter of 10 pieces of conductive fine particles in an observation of a cross section of the antistatic layer in a transmission electron microscopic (TEM) photograph or a scanning electron microscopic (STEM) photograph.

In the optical layered body of the present invention, the conductive fine particles preferably form chain-like or needle-like aggregates. The conductive fine particles in such a form do not easily move within the antistatic layer. Thus, even if the antistatic layer shrinks a little on curing in a durability test, the conductive fine particles are stably allowed to stay in the antistatic layer while causing almost no change in the surface resistance of the optical layered body. Moreover, as the adjacent chain-like or needle-like aggregates of the conductive fine particles easily contact with one another in the antistatic layer, addition of even a small amount of them allows the antistatic layer to have sufficient conductivity. Meanwhile, if the conductive fine particles in the antistatic layer are single particles, the adjacent conductive fine particles in the antistatic layer do not easily contact with one another. Thus, a large amount of the conductive fine particles need to be added to achieve sufficient antistatic performance, which may cause the following problems: the adhesion between the antistatic layer and other layers decreases; the conductivity of the antistatic layer is reduced by deterioration of the contact resistance due to increase in the contact among the conductive fine particles; and an influence of changes in the conductivity with time is more likely to be increased.

Here, the term "chain-like or needle-like" means a configuration where at least two pieces of the conductive fine particles are connected to form a linear or branched aggregate. The chain-like or needle-like conductive fine particles are collectively referred to as "chain-like conductive fine particles" in the following description.

The chain-like conductive fine particles are not an aggregate of the primary particles of the conductive fine particles formed simply by the interparticle forces, but are preferably an aggregate of the conductive fine particles connected to one another. Such conductive fine particles may form a straight or polygonal line, or a curve.

The chain-like conductive fine particles may be in any shape as long as at least two pieces of the conductive fine particles are connected. Preferably, from 2 to 50 pieces of the conductive fine particles are connected. Connection of less than two pieces of the conductive fine particles may fail to sufficiently reduce the surface resistance. Connection of more than 50 pieces of the conductive fine particles may reduce the light transmittance of the antistatic layer to increase the haze. More preferably, a minimum number of the connected conductive fine particles forming the chain-like conductive fine particles is 3, and a maximum number thereof is 30.

The chain-like conductive fine particles have an average length of preferably 12 to 500 nm. An average length of less than 12 nm increases the contact resistance so that the surface resistance of the antistatic layer may not be effectively reduced. An average length of more than 500 nm may fail to achieve the transparency of the antistatic layer. More preferably, the chain-like conductive fine particles has a minimum average length of 20 nm and a maximum average length of 300 nm.

Herein, "average length of the chain-like conductive fine particles" refers to an average length of 10 pieces of the chain-like conductive fine particles in an observation of a cross section of the antistatic layer in a transmission electron microscopic (TEM) photograph or a scanning electron microscopic (STEM) photograph. Specifically, for example, 10 pieces of the chain-like conductive fine particles are selected in a transmission electron microscopic (TEM) photograph of a cross section of the antistatic layer. The photograph is taken at a magnification (for example, magnification of not less than 200,000 times) enabling measurement of the size of each chain-like aggregate of the conductive fine particles formed of two or more pieces of the connected conductive fine particles. The selected chain-like conductive fine particles each are measured for the largest length. The average of the measured lengths is considered as the average length of the chain-like conductive fine particles in the antistatic layer. The chain-like conductive fine particles are in various forms such as a curve line. For determination of the length, a distance between two most separated points on each particle is measured.

The chain-like conductive fine particles can be obtained by, for example, the following method.

First, an alcohol solution containing 0.1 to 5% by mass of a metal salt or a metal alkoxide is heated to hydrolyze the metal salt or metal alkoxide so that a gel dispersion containing conductive fine particles having an average primary particle diameter of 1 to 100 nm is prepared. During the preparation, warm water or alkali may be added, if necessary.

Then, the gel dispersion is filtered, washed, and then burned at a temperature of 200 to 800° C. in the air to prepare conductive fine particles (metal oxide fine particles).

Next, powders of the burned conductive fine particles are dispersed in at least one of acid or alkaline water and an alcohol solvent to give a dispersion with a concentration of 10 to 50% by mass. The dispersion is optionally subjected to mechanical dispersion treatment in the presence of an organic stabilizer.

Specific examples of the organic stabilizer include gelatin, polyvinyl alcohol, polyvinyl pyrrolidone, polycarboxylic acid such as oxalic acid, malonic acid, succinic acid, glutaric acid, adipic acid, sebacic acid, maleic acid, fumaric acid, phthalic acid, and citric acid, or salts or heterocyclic compounds thereof, and mixtures of these.

The mechanical dispersion treatment allows peptization of the generated gel to give a sol containing the chain-like conductive fine particles dispersed therein. Examples of the mechanical dispersion treatment include dispersion with a sand mill and impact dispersion. In particular, impact dispersion is preferably employed.

The chain-like conductive fine particles are usually separated from the generated dispersion by, for example, centrifuge, and then washed with acid or the like, if necessary. The dispersion containing the chain-like conductive fine particles may be used for forming an antistatic layer without any treatment.

Examples of commercially available dispersion containing the chain-like conductive fine particles include ELCOM-V3560, DP1197, DP1203, DP1204, DP1207, and DP1208 produced by JGC Catalysts and Chemicals Ltd.

The amount of the conductive fine particles in the antistatic layer is appropriately adjusted depending on, for example, the type, shape, and size of the conductive fine particles to be used. Preferably, for example, the amount is 100 to 300 parts by mass for 100 parts by mass of a below mentioned resin component. An amount of less than 100 parts by mass may lead to insufficient antistatic performance of the optical layered body of the present invention. An amount of more than 300 parts by mass may lead to poor adhesion of the antistatic layer to other layers, reduce the conductivity of the antistatic layer due to deterioration of the contact resistance caused by increase in the contact among the conductive fine particles, and is more likely to increase the influence of the changes in the conductivity with time. More preferably, the lower limit of the amount of the conductive fine particles is 150 parts by mass, and the upper limit of the conductive fine particles is 250 parts by mass. The amount within the above ranges enables to ensure adhesion to the light-transmitting substrate while achieving a stable resistance.

The resin component is a polymer and is a material functioning as a binder component in the antistatic layer. The resin component contains no reactive functional group in a molecule, is soluble in a below-mentioned solvent, and is compatible with the conductive fine particles.

If the antistatic layer includes a resin component, which is a polymer, as a binder component, the optical layered body of the present invention does not shrink on curing after a durability test, and thus is stable with no change in the surface resistance.

For this reason, the resin component contains no reactive functional group in a molecule. Due to no reactive functional group in a molecule, the resin component does not undergo a secondary reaction so that the performance of an antistatic layer formed by application of the composition for an antistatic layer and drying can be maintained. If the resin component contains a reactive group in a molecule, a reaction of the resin component caused by dark reaction may gradually proceed in the antistatic layer formed by application of the composition for an antistatic layer and drying. A long term, gradual reaction of the resin component may cause bonds in the molecules of the resin component so that the physical distance created by the molecules of the resin component may decrease. This unfortunately reduces the physical distance between the conductive fine particles in the antistatic layer and increases the conductive path. Thus, the conductivity of the antistatic layer is increased to reduce the resistance. Moreover, if the resin component contains a reactive functional group in a molecule, the reactive functional group is reacted in a durability test. This causes shrinkage on curing of the antistatic layer to change the surface resistance.

The reactive functional groups means functional groups that may react in a durability test, and examples thereof include functional groups having unsaturated double bonds such as acryloyl groups or vinyl groups; cyclic ether groups such as epoxy ring or oxetane ring; ring-opening polymerization groups such as lactone ring; and isocyanate groups capable of forming urethane.

The resin component preferably contains none of these reactive functional groups; however, it may contain the reactive functional groups in an amount that would not cause shrinkage on curing of the antistatic layer after a durability test. The term "that would not cause shrinkage on curing of the antistatic layer" means that the change in the surface resistance after a durability test is within the aforementioned ranges.

The resin component is soluble in a below-mentioned solvent and is compatible with the conductive fine particles. The antistatic layer including the composition for an antistatic layer that contains such a resin component is excellent in the dispersibility of the conductive fine particles and also has a greatly stable surface resistance with time.

The term "soluble" herein means that a resin solution obtained by dissolving the resin component in a below-mentioned solvent does not generate gel components, and the resin solution has a lower viscosity as the proportion of the solvent in the resin solution increases. The term "compatible" herein means that, in the case where the composition for an antistatic layer including a mixture of the resin solution and the conductive fine particles contains the conductive fine particles in an arbitrary amount at least in a range of 100 to 300 parts by mass for 100 parts by mass of the resin component, the composition for an antistatic layer does not form a gel and is uniformly dispersed. Moreover, the composition for an antistatic layer can be evenly applied to form a coat such that an antistatic layer formed by drying the coat shows no deterioration in the appearance such as an increase in the haze.

The resin component preferably has a side chain.

The resin component having a side chain does not easily move in the antistatic layer due to the side chain serving as steric hindrance. Such a resin component more favorably allows the optical layered body of the present invention to be excellent in the stability of the surface resistance.

The resin component preferably has a weight average molecular weight of 20,000 to 200,000. The resin component having a weight average molecular weight of less than 20,000 fails to provide an antistatic layer with sufficient hardness. Thus, the surface resistance may be unstable before and after a durability test. The resin component having a weight average molecular weight of more than 200,000 may excessively increase the viscosity of a below-mentioned composition for an antistatic layer, making application of the composition for an antistatic layer impossible in some cases. More preferably, the minimum weight average molecular weight is 50,000, and the maximum weight average molecular weight is 100,000.

The weight average molecular weight can be determined by polystyrene conversion using gel permeation chromatography (GPC). The solvent for a GPC mobile phase may be tetrahydrofuran or chloroform. A measurement column to be used may be a combination of commercially available columns for tetrahydrofuran or chloroform. Examples of the commercially available columns include Shodex GPC KF-801, GPC KF-802, GPC KF-803, GPC KF-804, GPC KF-805, and GPC-KF 800D (all are trade names, from Showa Denko K.K.). For the detector, an RI (differential refractive index) detector and a UV detector may be used. The weight average molecular weight can be appropriately determined using such a solvent, a column, and a detector, with a GPC system such as Shodex GPC-101 (produced by Showa Denko K.K.).

The resin component preferably has a glass transition temperature of 80 to 120° C. The resin component having a glass transition temperature of lower than 80° C. becomes soft and may have unstable resistance. The resin component having a glass transition temperature of higher than 120° C. becomes hard and may have lower adhesion to the light-transmitting substrate. More preferably, the lowest glass transition temperature is 90° C., and the highest glass transition temperature is 110° C. The resin component having a glass transition temperature within the above ranges can surely achieve the adhesion to the light-transmitting substrate while a stable resistance is achieved.

The resin component is preferably at least one selected from the group consisting of acrylic resins, cellulosic resins, urethane resins, vinyl chloride resins, polyester resins, polyolefin resins, polycarbonate, nylons, polystyrene, and ABS resins.

Examples of the acrylic resins include polymethyl methacrylate.

Examples of the cellulosic resins include diacetyl cellulose, cellulose acetate propionate (CAP), and cellulose acetate butyrate (CAB).

Examples of the urethane resins include urethane resin.

Examples of the vinyl chloride resins include polyvinyl chloride and vinyl chloride-vinyl acetate copolymers.

Examples of the polyester resins include polyethylene terephthalate.

Examples of the polyolefin resins include polyethylene and polypropylene.

The resin component in the optical layered body of the present invention is preferably thermoplastic resin. In particular, polymethyl methacrylate is favorably used as it is capable of easily preventing bleed out of the conductive fine particles and is excellent in compatibility and weatherability.

The antistatic layer preferably has a thickness of 0.1 to 1.0 μm. The antistatic layer having a thickness of less than 0.1 μm may fail to have sufficient resistance. The antistatic layer having a thickness of more than 1.0 μm has poor adhesion to the light-transmitting substrate, and may have a lower total light transmittance depending on the materials of the conductive fine particles. More preferably, the antistatic layer has a minimum thickness of 0.2 μm, and has a maximum thickness of 0.5 μm.

The thickness of the antistatic layer is a value obtained by observing and measuring a cross section of the antistatic layer with an electron microscope (e.g., SEM, TEM, STEM).

The solvent is preferably an organic solvent in which the resin component is soluble with the aforementioned solubility. Examples of the solvent include ketones (e.g., acetone, methyl ethyl ketone, methyl isobutyl ketone, cyclohexanone), ethers (e.g., dioxane, tetrahydrofuran), aliphatic hydrocarbons (e.g., hexane), alicyclic hydrocarbons (e.g., cyclohexane), aromatic hydrocarbons (e.g., toluene, xylene), halogenated hydrocarbons (e.g., dichloromethane, dichloroethane), esters (e.g., methyl acetate, ethyl acetate, butyl acetate), alcohols (e.g., ethanol, isopropanol, butanol, cyclohexanol, propylene glycol monomethylether), cellosolves (e.g., methyl cellosolve, ethyl cellosolve), cellosolve acetates, sulfoxides (e.g., dimethyl sulfoxide), and amides (e.g., dimethyl formamide, dimethyl acetamide). These solvents may be used in admixture.

If the conductive fine particles are the aforementioned chain-like conductive fine particles, the chain-like conductive fine particles are prepared using water or alcohol as mentioned earlier. Thus, in the case of using the chain-like conductive fine particles, the solvent for the composition for an antistatic layer is most preferably alcohol. Meanwhile, in the case of using a solvent containing only a small amount of polar groups, especially a solvent containing no hydroxy group, a dispersant additionally needs to be added which disperses the chain-like conductive fine particles. This results in the chain-like conductive fine particles to have larger distances between them so that the resulting antistatic layer has a higher surface resistance.

If the resin component is polymethyl methacrylate, usually the polymethyl methacrylate is likely to be insoluble or hardly soluble in alcohol but is easily soluble in a solvent containing no hydroxyl group and a small amount of polar groups. Specifically, the polymethyl methacrylate is likely to be easily soluble in, for example, ketones, aliphatics, hydrocarbons, alicyclic hydrocarbons, aromatic hydrocarbons, or esters. Thus, selection of a solvent from the above solvents enables preparation of a polymethyl methacrylate solution. Moreover, use of the solution contributes to easy preparation of the composition for an antistatic layer.

The conductive fine particles (chain-like conductive fine particles) and the resin component (polymethyl methacrylate) need to be stable in the composition for an antistatic layer. Namely, if an excessive amount of a solvent containing only a small amount of polar groups is added as the solvent, the chain-like conductive fine particles cannot be stable, causing problems such as aggregation, gelation, or sedimentation. If an excessive amount of a solvent having high polarity such as alcohol is added, polymethyl methacrylate, i.e., the resin component, cannot be stable, causing problems such as deposition or gelation. Thus, such composition for an antistatic layer cannot be used as the composition for an antistatic layer of the present invention so that the purpose of the present invention cannot be achieved.

Hence, in the case of the composition for an antistatic layer including polymethyl methacrylate as the resin component, preferably methylisobutyl ketone is used as the solvent, and furthermore a glycol ester is added as a solvent upon mixture of an alcohol dispersion containing the chain-like conductive fine particles to allow the polymethyl methacrylate and the chain-like conductive fine particles to be more stable. Meanwhile, a glycol ester has intermediate characteristics between methyl isobutyl ketone and alcohol, and evaporates slowly. Especially preferably, the solvent further contains propylene glycol monomethyl ether: In this case, propylene glycol monomethyl ether, which evaporates slowly, remains to the last even in drying of the composition for an antistatic layer, thereby preventing negative influences such as gelation of the polymethyl methacrylate or aggregation of the chain-like conductive fine particles. Thus, the antistatic layer to be obtained can stably achieve a desired durability.

The composition for an antistatic layer containing the aforementioned materials preferably does not contain the aforementioned monomer component. However, it may contain the monomer component in an amount that would not cause shrinkage on curing of the antistatic layer after a durability test as mentioned earlier.

The composition for an antistatic layer may be prepared by any method which allows uniform mixing of the components. For example, the method may be one using any known device such as a paint shaker, a bead mill, a kneader, or a mixer.

The antistatic layer may be formed by applying the composition for an antistatic layer to the light-transmitting substrate to form a coat, and drying the coat.

The application may be performed by any method. Examples of the method include known methods such as spin coating, dipping, spraying, die coating, bar coating, roll coating, meniscus coating, flexo printing, screen printing, or bead coating.

The optical layered body of the present invention includes a light-transmitting substrate.

The light-transmitting substrate preferably has smoothness, heat resistance, and excellent mechanical strength.

Specific examples of materials for forming the light-transmitting substrate include thermoplastic resins such as polyesters (polyethylene terephthalate, polyethylene naphthalate), cellulose triacetate, cellulose diacetate, cellulose acetate butylate, polyesters, polyamide, polyimide, polyether sulfone, polysulfone, polypropylene, polymethylpentene, polyvinyl chloride, polyvinyl acetal, polyether ketone, polymethyl methacrylate, polycarbonate, and poly-urethane. Preferred among these are polyesters (polyethylene terephthalate, polyethylene naphthalate) and cellulose triacetate.

The light-transmitting substrate is preferably a highly flexible film of any of the above materials, but may be a plate of any of the materials if the intended use requires hardness, or may be a glass plate.

Other examples of the light-transmitting substrate include alicyclic amorphous olefin polymer (cyclo olefin polymer: COP) films. These are substrates produced using a compound such as a norbornene polymer, a monocyclic olefin polymer, a cyclic conjugated diene polymer, or a vinyl alicyclic hydrocarbon polymer. Examples thereof include ZEONEX and ZEONOR (norbornene resins) produced by Zeon Corporation; SUMILITE FS-1700 produced by Sumitomo Bakelite Co., Ltd.; ARTON (modified norbornene resin) produced by JSR Corporation; APEL (cycloolefin copolymer) produced by Mitsui Chemicals, Inc.; Topas (cyclic olefin copolymer) produced by Ticona; and OPTOREZ OZ-1000 series (cyclic acrylic resins) produced by Hitachi Chemical Co., Ltd.

Also, a preferred alternative substrate for triacetyl cellulose is FV series (low birefringence, low photoelastic film) produced by Asahi Kasei Chemicals Corporation.

The light-transmitting substrate in a film form preferably has a thickness of 10 to 300 µm, and more preferably has a maximum thickness of 200 µm and a minimum thickness of 20 µm. If the light-transmitting substrate is a plate, the thickness may exceed the maximum thickness.

Before the antistatic layer is formed on the light-transmitting substrate, the substrate may be subjected to a physical or chemical treatment such as corona discharge treatment or oxidation treatment, and may be coated with a coating material called an anchoring agent or primer, for improvement of the adhesion.

Preferably, the optical layered body of the present invention further includes a hard coat layer arranged on a face on an opposite side of the antistatic layer with respect to the light-transmitting substrate.

The antistatic layer is thus disposed between the hard coat layer and the light-transmitting substrate. The optical layered body of the present invention having such a structure has excellent hard coat performance, and furthermore has more stable surface resistance after a durability test.

The hard coat layer is formed of a composition for a hard coat layer containing electricity transmission fine particles, a monomer component, a resin component, and an ultraviolet absorber. The resin component may be the same as those mentioned for the resin component contained in the antistatic layer. The resin component contained in the composition for a hard coat layer is preferably the same as or similar to the resin component contained in the antistatic layer. If the hard coat layer contains the same or similar resin component as the antistatic layer, it has excellent adhesion to the hard coat layer.

Meanwhile, the composition for a hard coat layer may contain, as the resin component, the same or a similar resin component as and a different resin component from that contained in the antistatic layer. In this case, the main ingredient (i.e., a content of 50% by mass or more based on all resin components) of the resin component in the composition for a hard coat layer is preferably the same as or similar to the resin component contained in the antistatic layer.

Examples of the monomer component include compounds having one, or two or more unsaturated bond(s), such as a compound having an acrylate-based functional group. Examples of compounds having one unsaturated bond include ethyl (meth)acrylate, ethylhexyl (meth)acrylate, styrene, methylstyrene, and N-vinylpyrrolidone. Examples of compounds having two or more unsaturated bonds include polyfunctional compounds such as polymethylolpropane tri(meth)acrylate, hexanediol (meth)acrylate, tripropylene glycol di(meth)acrylate, diethylene glycol di(meth)acrylate, pentaerythritol tri(meth)acrylate, dipentaerythritol hexa(meth)acrylate, 1,6-hexanediol di(meth) acrylate, and neopentylglycol di(meth)acrylate; and reaction products of these polyfunctional compounds with (meth) acrylate, or the like (for example, poly(meth)acrylate esters of polyols).

The monomer component herein includes precursors of hardening resin, and includes so-called oligomers.

In addition to the above compounds, relatively low-molecular weight resins having an unsaturated double bond, such as polyester resin, polyether resin, acrylic resin, epoxy resin, urethane resin, alkyd resin, spiroacetal resin, polybutadiene resin, or polythiol-polyene resin, can also be used as the resin component for the composition for a hard coat layer.

The electricity transmission fine particles are added for ensuring the antistatic performance of the optical layered body of the present invention, and they function to provide electricity transmission between the surface of the hard coat layer and the antistatic layer.

Any electricity transmission fine particle may be used. Favorable examples thereof include coating fine particles in which a conductive coat layer is formed on the surfaces of core fine particles.

Materials forming the coating fine particles may be the same as those mentioned for the conductive fine particles in the antistatic layer, for example.

The electricity transmission fine particles preferably have an average particle diameter of 3 to 10 µm. The electricity transmission fine particles having an average particle diameter of less than 3 µm may form a hard coat layer that is too thin to have sufficient hard coat performance. The electricity transmission fine particles having an average particle diameter of more than 10 µm may form a hard coat layer that is too thick, so that the transparency may deteriorate, or the conductive fine particles may fall off the layer. More preferably, the electricity transmission fine particles have a minimum average particle diameter of 4 µm and a maximum average particle diameter of 7 µm.

The electricity transmission fine particles each preferably have a size equal to or larger than the thickness of the hard coat layer, Namely, the electricity transmission fine particles are preferably present near the surface of the hard coat layer, or are protruded from the surface. If the electricity transmission fine particles are too small relative to the thickness of the hard coat layer, the optical layered body of the present invention may have excessively high surface resistance and poor antistatic performance. Specifically, the electricity transmission fine particles preferably have an average particle diameter that is 0.8 to 1.5 times the size of the thickness of the hard coat layer. If the average particle diameter is less than 0.8 times the size of the thickness of the hard coat layer, the optical layered body of the present invention may have insufficient antistatic performance. If the average particle diameter is more than 1.5 times the size of the thickness of the hard coat layer, the electricity transmission fine particles may fall off the hard coat layer.

The amount of the electricity transmission fine particles is preferably 0.5 to 2.0 parts by mass for 100 parts by mass of the resin component in the hard coat layer. If the amount is less than 0.5 parts by mass, the optical layered body of the present invention may have insufficient antistatic performance. If the amount is more than 2.0 parts by mass, a hard coat layer to be formed unfortunately becomes hazy (has a high turbidity) and may have poor optical characteristics. Moreover, the composition for a hard coat layer may have a high viscosity to have poor application characteristics, which may result in unevenness or lines on the applied surfaces. Furthermore, the hard coat layer may have poor hard coat performance. More preferably, the maximum amount of the electricity transmission fine particles is 1.5 parts by mass.

The ultraviolet absorber is a material for ensuring the light resistance of the optical layered body of the present invention. Namely, the presence of the ultraviolet absorber in the optical layered body of the present invention enables to reduce changes in the surface resistance after a durability test.

In more detail, the ultraviolet absorber in the hard coat layer absorbs ultraviolet rays emitted during the durability test, which suppresses degradation reactions caused by the ultraviolet rays, such as decomposition of the resin component included in the antistatic layer, and also maintains the distances among the conductive fine particles in the antistatic layer. Thus, the optical layered body of the present invention has an enhanced durability. For achieving this effect, the ultraviolet absorber is disposed at a site capable of protecting the antistatic layer in the hard coat layer.

Unlimited examples of the ultraviolet absorber include organic or inorganic ultraviolet absorbers. Organic ultraviolet absorbers are especially preferable because of their excellent transparency.

Examples of the ultraviolet absorber include: benzotriazole ultraviolet absorbers, for example, 2'-hydroxy phenyl-5-chloro benzotriazole ultraviolet absorbers such as 2-(2'-hydroxy-3',5'-di-tert-butylphenyl)-5-chloro benzotriazole, 2-(2'-hydroxy-3'-tert-butyl-5'-methyl phenyl)-5-chloro benzotriazole, 2-(2'-hydroxy-3'-tert-amyl-5'-methylphenyl)-5-chloro benzotriazole, 2-(2'-hydroxy-3'-isobutyl-5'-methyl phenyl)-5-chloro benzotriazole, or 2-(2'-hydroxy-3'-isobutyl-5'-propylphenyl)-5-chloro benzotriazole, and 2'-hydroxy phenyl benzotriazole ultraviolet absorbers such as 2-(2'-hydroxy-3',5'-di-tert-butylphenyl)benzotriazole, or 2-(2'-hydroxy-5'-methylphenyl)benzotriazole; benzophenone ultraviolet absorbers, for example, 2,2'-dihydroxy benzophenone ultraviolet absorbers such as 2,2'-dihydroxy-4-methoxy benzophenone, 2,2'-dihydroxy-4,4'-dimethoxy benzophenone, or 2,2'-dihydroxy-4,4'-tetrahydroxy benzophenone, and 2-hydroxy benzophenone ultraviolet absorbers such as 2-hydroxy-4-methoxy benzophenone, or 2,4-dihydroxy benzophenone; and salicylic acid ester ultraviolet absorbers such as phenyl salicylate or 4-t-butyl-phenylsalicylate. Hydroxy phenyl triazine ultraviolet absorbers are especially preferable.

Other examples of the ultraviolet absorber include reactive ultraviolet absorbers in which an acryloyl group or methacryloyl group is introduced in a benzotriazole skeleton. If high transparency is unnecessary, inorganic ultraviolet absorbers may be added. Examples of the inorganic ultraviolet absorbers include titanium oxide, cerium oxide and iron oxide each having a particle diameter of not more than 0.2 μm.

The ultraviolet absorber preferably has an ultraviolet ray transmittance at 380 nm of 2 to 40%. An ultraviolet ray transmittance of less than 2% may fail to sufficiently cure the hard coat layer, leading to poor hard coat performance. An ultraviolet ray transmittance of more than 40% may cause larger changes in the light resistance with time of the optical layered body of the present invention, or may lead to poor adhesion between the layers in the optical layered body of the present invention. Meanwhile, the ultraviolet ray transmittance is a transmittance of ultraviolet rays at 380 nm measured with a spectrometer on the optical layered body of the present invention including the light-transmitting substrate, antistatic layer and hard coat layer.

The amount of the ultraviolet absorber is appropriately set depending on the ultraviolet ray absorbing ability of the ultraviolet absorber so that the ultraviolet ray transmittance is within the aforementioned ranges. For example, in the case of using hydroxy phenyl triazine as the ultraviolet absorber, the amount thereof is preferably 3 to 15% by mass in the hard coat layer.

The composition for a hard coat layer may contain thermosetting resin as the resin component. Examples of the thermosetting resin include phenolic resin, urea resin, diallyl phthalate resin, melamine resin, guanamine resin, unsaturated polyester resin, epoxy resin, amino alkyd resin, melamine-urea cocondensation resin, silicon resin, and polysiloxane resin.

Preferably, the composition for a hard coat layer further contains a photo polymerization initiator.

Any known photo polymerization initiator may be used as the photo polymerization initiator. Examples thereof include acetophenones (e.g., Irgacure (trade name) 184 (1-hydroxycyclohexyl-phenyl-ketone) produced by BASF Japan Ltd., Irgacure (trade name) 907 (2-methyl-1[4-(methyl thio)phenyl]-2-morpholinopropan-1-on) produced by BASF Japan Ltd.), benzophenones, thioxanthones, benzoin, benzoinmethyl ethers, aromatic diazonium salts, aromatic sulfonic salts, aromatic iodonium salts, meta-cellon compounds, and benzoinsulfonic acid esters. Acetophenones are especially preferable.

The amount of the photo polymerization initiator is preferably 1 to 7 parts by mass for 100 parts by mass of the monomer component in the composition for a hard coat layer. An amount of less than 1 part by mass is insufficient for the photopolymerization, and thus may lead to insufficient curing. An amount of more than 7 parts by mass is excessive for the photopolymerization, and thus may cause photopolymerization reactions which are not desired ones to even result in insufficient hardness, or may cause disadvantages due to undissolved residues of the photopolymerization initiator.

The amount of the photo polymerization initiator is more preferably 2 to 5 parts by mass for 100 parts by mass of the monomer component.

The composition for a hard coat layer may further contain other components as needed in addition to the aforementioned components.

Examples of other components include thermal polymerization initiators, photostabilizers, cross-linking agents, curing agents, polymerization accelerators, viscosity adjusting agents, antioxidants, anti-fouling agents, slipping agents, refractive index adjusting agents, dispersants, dispersing agents, fillers, and anti-glare agents. Known products of these may be used.

The composition for a hard coat layer preferably has a total solids content of 20 to 45%. If the total solids content is less than 20%, a residue of the solvent may remain, or whitening may occur. If the total solids content is more than 45%, the composition for a hard coat layer has a high viscosity to have poor application characteristics, which may result in unevenness or lines on the applied surfaces. The solids content is more preferably 20 to 30%.

The composition for a hard coat layer can be prepared by mixing and dispersing the electricity transmission fine particles, the monomer component, the resin component, the ultraviolet absorber, and other components such as a photopolymerization initiator in an solvent.

The mixing and dispersing may be favorably performed with a known device such as a paint shaker, a bead mill, or a kneader.

Examples of the solvent include alcohol (e.g., methanol, ethanol, propanol, isopropanol, n-butanol, s-butanol, t-butanol, benzyl alcohol, PGME, ethylene glycol), ketone (e.g., acetone, methylethyl ketone, methylisobutyl ketone, cyclopentanone, cyclohexanone, heptanone, diisobutyl ketone, diethyl ketone), aliphatic hydrocarbon (e.g., hexane, cyclohexane), halogenated hydrocarbon (e.g., methylene chloride, chloroform, carbon tetrachloride), aromatic hydrocarbon (e.g., benzene, toluene, xylene), amide (e.g., dimethyl formamide, dimethyl acetamide, n-methylpyrrolidone), ether (e.g., diethylether, dioxane, tetrahydrofuran), and ether alcohol (e.g., 1-methoxy-2-propanol). Methylisobutyl ketone is especially preferable as it has little influence on the antistatic layer and is highly soluble in monomers and thermoplastic resin. Isopropanol is preferred as it is less likely to cause application defects such as uneven application on the surface of the hard coat layer, although the reason is not clear.

The hard coat layer can be formed by applying the composition for a hard coat layer to the antistatic layer to foam a coat, drying the coat if necessary, and then curing the coat.

Examples of the method for forming a coat by applying the composition for a hard coat layer include slit-reverse coating, spin coating, dipping, spraying, die coating, bar coating, roll coating, meniscus coating, flexo printing, screen printing, and bead coating.

The composition for a hard coat layer is applied preferably in an amount of 3 to 15 g/m$^2$. An amount of less than 3 g/m$^2$ may fail to form a hard coat layer having a desired hardness. An amount of more than 15 g/m$^2$ may fail to sufficiently prevent curling or damage. The amount is more preferably 4 to 10 g/m$^2$.

The drying may be performed by any method but is in general preferably performed at a temperature of 30 to 100° C. for 3 to 120 seconds. If the drying is performed at a temperature lower than 30° C., it takes a long time to produce the optical layered body of the present invention. Moreover, the production cost may increase. The drying at a temperature higher than 100° C. may cause problems of poor flatness of the light-transmitting substrate or uneven surfaces of the hard coat layer. The highest temperature for the drying is more preferably 70° C.

If the drying time is shorter than 3 seconds, the hard coat layer to be formed may poorly adhere to the antistatic layer. If the drying time is longer than 120 seconds, the drying takes a long time, and thus the production cost may increase.

The coat can be cured by any known method and the method may be selected depending on the formulation of the composition for a hard coat layer. For example, curing the coat by exposure to ultraviolet rays may be mentioned.

In the case of the exposure to ultraviolet rays, the dose of the ultraviolet rays is preferably not less than 30 mJ/cm$^2$, more preferably not less than 50 mJ/cm$^2$, and still more preferably not less than 80 mJ/cm$^2$.

The hard coat layer preferably has a thickness of 3 to 15 µm.

A film thickness of less than 3 µm may not allow the hard coat layer to have sufficient hardness. A film thickness of more than 15 µm may lead to residues of the solvent in the hard coat layer, poor adhesion of the coat, or insufficient prevention of curling or damage. More preferably, the hard coat layer has a thickness of 3 to 10 µm.

The thickness of the hard coat layer is measured by electron microscopic (SEM, TEM, STEM) observation of a cross section of the hard coat layer.

The hard coat layer has a hardness of preferably not lower than 2B and more preferably not lower than B when measured by a pencil hardness test (load: 4.9 N) in accordance with JIS K5600-5-4(1999).

The optical layered body of the present invention preferably has a total light transmittance of at least 85%. A total light transmittance of lower than 85% may deteriorate the color reproducibility and visibility and also may fail to achieve a desired contrast, when the optical layered body is disposed on the surface of a display. The total light transmittance is more preferably at least 88%.

The total light transmittance can be measured by a method in accordance with JIS K-7361 using a haze meter (product of Murakami Color Research Laboratory, product number: HM-150).

The optical layered body of the present invention preferably has a haze of 2% at most. A haze of higher than 2% may fail to achieve desired optical properties, decreasing the visibility when the optical layered body of the present invention is disposed on the surface of an image display.

The haze can be measured by a method in accordance with JIS K-7136 using a haze meter (product of Murakami Color Research Laboratory, product number: HM-150).

The optical layered body of the present invention may appropriately include other single or multiple layers (e.g., antiglare layer, another antistatic layer, low refractive index layer, anti-fouling layer, adhesive layer, another hard coat layer) as needed as long as the effect of the present invention is maintained. The optical layered body preferably has at least one of an antiglare layer, a low refractive index layer, and an anti-fouling layer. These layers may be the same as those for known anti-reflection laminated bodies.

The optical layered body of the present invention may be used for an image display device. An image display device including the optical layered body of the present invention is one aspect of the present invention.

The image display device may be, for example, an LCD, PDP, FED, ELD (organic EL, inorganic EL), CRT, touch panel, or electronic paper.

An LCD includes a transparent display and a lighting system for irradiating the transparent display from the back. In the case that the image display device of the present invention is an LCD, the image display device has the optical layered body of the present invention on the surface of the transparent display. The transparent display of the LCD includes a liquid crystal display element that has a liquid crystal layer, with a polarizer provided on the image display side of the liquid crystal layer and a polarizer on the lighting system side of the liquid crystal layer.

In the case that the present invention relates to a liquid crystal display device including the optical layered body, the optical layered body is irradiated by a light source of the lighting system from its bottom side (substrate side). An STN liquid crystal display device may have a retardation plate between a liquid crystal display element and a polarizer. The liquid crystal display device may optionally have an adhesive layer between the layers.

A PDP has a front glass substrate and a back glass substrate facing the front glass substrate, with discharge gas enclosed between the substrates. In the case that the image display device of the present invention is a PDP, the display device includes the above optical layered body on the surface of the front glass substrate or a front plate (glass substrate or film substrate) of the front glass substrate.

Examples of other image display devices include an ELD device configured to provide display by controlling the voltage applied to a glass substrate where a material which emits light upon voltage application, such as zinc sulfide or a diamine substance, is deposited; or a CRT configured to convert electric signals into light and produce images that are visible to human eyes. Each of the above display devices with the aforementioned structure includes the above optical layered body on its outermost surface or on the surface of the front plate.

In any of the above cases, the optical layered body of the present invention can be used for display on televisions, computers, for example. Particularly, the optical layered body of the present invention can be suitably provided on the surface of high definition image displays, such as liquid crystal panels, PDPs, ELDs, touch panels, or electronic papers.

Advantageous Effects of Invention

The optical layered body of the present invention includes an antistatic layer that is formed from a composition for an antistatic layer containing conductive fine particles, a resin component, and a solvent. Thus, the optical layered body is excellent in the stability of the surface resistance after a durability test. Moreover, as the optical layered body of the present invention has a hard coat layer formed from the composition containing electricity transmission fine particles, a monomer component, the same resin component as that in the antistatic layer, and an ultraviolet absorber on the antistatic layer, the optical layered body is provided with hard coat performance and is excellent in the adhesion between the layers included therein. Thus, the optical layered body shows little change in the surface resistance before and after a durability test.

Hence, the optical layered body of the present invention can be suitably used for displays such as cathode ray tube (CRT) display devices, liquid crystal displays (LCD), plasma display panels (PDP), electroluminescence displays (ELD), touch panels, or electronic paper, and can be particularly suitably used for high definition image displays.

DESCRIPTION OF EMBODIMENTS

The present invention is described in more detail below with reference to, but not limited to, examples and comparative examples.

The "part(s)" or "%" in the description is based on mass unless otherwise stated.

Example 1

Formation of Antistatic Layer

HRAG acryl (25) MIBK (thermoplastic resin, polymethyl methacrylate resin, solids content: 25%, MIBK solution, weight average molecular weight: 70,000, glass transition temperature: 100° C., produced by DNP Fine Chemicals Co., Ltd.) was dissolved in propylene glycol monomethyl ether. Then, V3560 (ATO dispersion, average particle diameter: 8 µm, produced by JGC Catalysts and Chemicals Ltd.) was added to the solution, followed by stirring, to adjust the final solids content to 8% and the ratio (mass ratio) of thermoplastic resin:ATO to 100:200. Thereby, a composition for an antistatic layer was prepared.

The composition for an antistatic layer was applied to a light-transmitting substrate (PET substrate, T600E25N produced by Mitsubishi Plastics Inc.) by slit-reverse coating to form a coat such that the coat dried had a thickness of 0.3 µm. The coat was dried at a temperature of 70° C. for one minute to form an antistatic layer.

(Formation of Hard Coat Layer)

Irgacure 184 (4 parts by mass, photo polymerization initiator, produced by BASF Japan, Ltd.) was added to a mixed solvent containing methyl isobutyl ketone (MIBK) and isopropanol (IPA) and dissolved by stirring to prepare a solution having a final solids content of 25% by mass. To this solution were added, as resin components, pentaerythritol triacrylate (PETA) and HRAG acryl (25) MIBK (thermoplastic resin produced by DNP Fine Chemicals Co., Ltd.) at a mass ratio of 70:30 in terms of the resin component to give a mixture. Then, 10-301 (TL) (produced by Dainichi-seika Color & Chemicals Mfg. Co., Ltd.) as a leveling agent was added to the mixture in an amount of 0.2 parts by mass for 100 parts by mass of the resin components, followed by stirring. To this solution was added a bright dispersion (conductive fine particle dispersion, produced by DNP Fine Chemicals Co., Ltd., average particle diameter: 4.6 µm, solids content: 25%) in an amount of 100 g based on 12 kg of a composition for a hard coat layer (final composition), followed by stirring. Lastly, an ultraviolet absorber (TINUVIN 477, produced by BASF Japan, Ltd.) was added in an amount of 6 parts by mass for 100 parts by mass of the resin, and stirred to give a composition for a hard coat layer having a total solids content of 25%.

The composition for a hard coat layer was applied to a surface of a separately prepared antistatic layer by slit-reverse coating to form a coat such that the amount of the coat dried was 6 g/m$^2$. The coat was dried at a temperature of 70° C. for one minute, and was then irradiated with ultraviolet rays at an irradiation dose of 80 mJ/cm$^2$ for curing to form a hard coat layer having a thickness of 5 µm. In this manner, an optical layered body was produced.

Example 2

An optical layered body was produced in the same manner as in Example 1, except that the amount of the ultraviolet absorber in the composition for a hard coat layer was 3 parts by mass.

Example 3

An optical layered body was produced in the same manner as in Example 1, except that the amount of the ultraviolet absorber in the composition for a hard coat layer was 10 parts by mass.

Example 4

An optical layered body was produced in the same manner as in Example 1, except that the amount of the ultraviolet absorber in the composition for a hard coat layer was 15 parts by mass.

Example 5

An antistatic layer was formed in the same manner as in Example 1, except that a thermoplastic resin having a weight average molecular weight of 50,000 and a glass transition temperature of 100° C. was used in place of the HRAG acryl (25) MIBK (thermoplastic resin, weight average molecular weight: 70,000, glass transition temperature: 100° C., produced by DNP Fine Chemicals Co., Ltd.). Next, a hard coat layer was formed in the same manner as in Example 1 to thereby give an optical layered body.

Example 6

An antistatic layer was formed in the same manner as in Example 1, except that a thermoplastic resin having a weight average molecular weight of 100,000 and a glass transition temperature of 100° C. was used in place of the HRAG acryl (25) MIBK (thermoplastic resin, weight average molecular weight: 70,000, glass transition temperature: 100° C., produced by DNP Fine Chemicals Co., Ltd.). Next, a hard coat layer was formed in the same manner as in Example 1 to thereby give an optical layered body.

Example 7

An antistatic layer was formed in the same manner as in Example 1, except that a thermoplastic resin having a weight average molecular weight of 70,000 and a glass transition temperature of 80° C. was used in place of the HRAG acryl (25) MIBK (thermoplastic resin, weight average molecular weight: 70,000, glass transition temperature: 100° C., produced by DNP Fine Chemicals Co., Ltd.). Next, a hard coat layer was formed in the same manner as in Example 1 to thereby give an optical layered body.

Example 8

An antistatic layer was formed in the same manner as in Example 1, except that a thermoplastic resin having a weight average molecular weight of 70,000 and a glass transition temperature of 110° C. was used in place of the HRAG acryl (25) MIBK (thermoplastic resin, weight average molecular weight: 70,000, glass transition temperature: 100° C., produced by DNP Fine Chemicals Co., Ltd.). Next, a hard coat layer was formed in the same manner as in Example 1, except that the total solid content was 26%, to thereby give an optical layered body.

Example 9

An antistatic layer was formed in the same manner as in Example 1, except that the ratio (mass ratio) of the thermoplastic resin:ATO was adjusted to 100:150. Next, a hard coat layer was formed in the same manner as in Example 1, except that the total solid content was 26%, to thereby give an optical layered body.

Example 10

An antistatic layer was formed in the same manner as in Example 1, except that the ratio (mass ratio) of the thermoplastic resin:ATO was adjusted to 100:250. Next, a hard coat layer was formed in the same manner as in Example 1, except that the total solid content was 26%, to thereby give an optical layered body.

Example 11

An antistatic layer was formed in the same manner as in Example 1, except that the thickness was changed to 0.2 µm. Next, a hard coat layer was formed in the same manner as in Example 1 to thereby give an optical layered body.

Example 12

An antistatic layer was formed in the same manner as in Example 1, except that the thickness was changed to 0.5 µm. Next, a hard coat layer was formed in the same manner as in Example 1 to thereby give an optical layered body.

Example 13

An antistatic layer was formed in the same manner as in Example 1. Next, a hard coat layer was formed in the same manner as in Example 1, except that the thickness was changed to 4 µm, to thereby give an optical layered body.

Example 14

An antistatic layer was formed in the same manner as in Example 1. Next, a hard coat layer was formed in the same manner as in Example 1, except that the thickness was changed to 7 µm, to thereby give an optical layered body.

Comparative Example 1

Irgacure 184 (4 parts by mass, photo polymerization initiator, produced by BASF Japan, Ltd.) was added to propylene glycol monomethyl ether (PGME) and dissolved by stirring to prepare a solution having a final solids content of 25% by mass. To this solution was added, as a resin component, pentaerythritol triacrylate (PETA) and stirred. Then, ATO was added to the solution in an amount that the ratio of PETA:ATO in a cured product was 100:200 and stirred to give a composition for an antistatic layer having a total solids content of 25%.

The composition for an antistatic layer was applied to a light-transmitting substrate (PET substrate, T600E25N produced by Mitsubishi Plastics Inc.) by slit-reverse coating to form a coat such that the coat dried had a thickness of 0.3 µm. The coat was dried at a temperature of 70° C. for one minute, and was then irradiated with ultraviolet rays at an irradiation dose of 80 mJ/cm$^2$ for curing to form an antistatic layer.

Next, a hard coat layer was formed in the same manner as in Example 1 to thereby give an optical layered body.

Comparative Example 2

An antistatic layer was formed in the same manner as in Comparative Example 1, except that dipentaerythritol hexaacrylate (DPHA) was used in place of the PETA. Next, a hard coat layer was formed in the same manner as in Example 1 to thereby give an optical layered body.

Comparative Example 3

An antistatic layer was formed in the same manner as in Comparative Example 1, except that 1,6-hexane diol (HDDA) was used in place of the PETA. Next, a hard coat layer was formed in the same manner as in Example 1 to thereby give an optical layered body.

Comparative Example 4

An antistatic layer was formed in the same manner as in Example 1, except that urethane acrylate (BS577, produced by Arakawa Chemical Industries, Ltd.) was used in place of the HRAG acryl (25) MIBK (thermoplastic resin, weight average molecular weight: 70,000, glass transition temperature: 100° C., produced by DNP Fine Chemicals Co., Ltd.). Next, a hard coat layer was formed in the same manner as in Example 1 to thereby give an optical layered body.

Comparative Example 5

An antistatic layer was formed in the same manner as in Comparative Example 1, except that a resin mixture containing HRAG acryl (25) MIBK and PETA at a resin ratio (mass ratio) of 1:1 was used in place of the PETA. Next, a hard coat layer was formed in the same manner as in Example 1 to thereby give an optical layered body.

Reference Example 1

An antistatic layer was formed in the same manner as in Example 1. Next, a hard coat layer was formed in the same manner as in Example 1, except that no ultraviolet absorber was added, to thereby give an optical layered body.

Reference Example 2

An antistatic layer was formed in the same manner as in Example 1. Next, a hard coat layer was formed in the same manner as in Example 1, except that the amount of the ultraviolet absorber was changed to 16 parts by mass, to thereby give an optical layered body.

Reference Example 3

An antistatic layer was formed in the same manner as in Example 1, except that a thermoplastic resin having a weight average molecular weight of 10,000 and a glass transition temperature of 110° C. was used in place of the HRAG acryl (25) MIBK (thermoplastic resin, weight average molecular weight: 70,000, glass transition temperature: 100° C., produced by DNP Fine Chemicals Co., Ltd.). Next, a hard coat layer was formed in the same manner as in Example 1 to thereby give an optical layered body.

Reference Example 4

An antistatic layer was formed in the same manner as in Example 1, except that a thermoplastic resin having a weight average molecular weight of 70,000 and a glass transition temperature of 70° C. was used in place of the HRAG acryl (25) MIBK (thermoplastic resin, weight average molecular weight: 70,000, glass transition temperature: 100° C., produced by DNP Fine Chemicals Co., Ltd.). Next, a hard coat layer was formed in the same manner as in Example 1 to thereby give an optical layered body.

Reference Example 5

An antistatic layer was formed in the same manner as in Example 1, except that the ratio (mass ratio) of the thermoplastic resin:ATO was adjusted to 100:50. Next, a hard coat layer was formed in the same manner as in Example 1, except that the total solid content was 26%, to thereby give an optical layered body.

Reference Example 6

An antistatic layer was formed in the same manner as in Example 1, except that the ratio (mass ratio) of the thermoplastic resin:ATO was adjusted to 100:350. Next, a hard coat layer was formed in the same manner as in Example 1, except that the total solid content was 26%, to thereby give an optical layered body.

Reference Example 7

An antistatic layer was formed in the same manner as in Example 1, except that the thickness was changed to 0.09 µm. Next, a hard coat layer was formed in the same manner as in Example 1 to thereby give an optical layered body.

Reference Example 8

An antistatic layer was formed in the same manner as in Example 1, except that the thickness was changed to 1.2 µm. Next, a hard coat layer was formed in the same manner as in Example 1 to thereby give an optical layered body.

Reference Example 9

An antistatic layer was formed in the same manner as in Example 1. Next, a hard coat layer was formed in the same manner as in Example 1, except that the thickness was changed to 2 µm, to thereby give an optical layered body.

Reference Example 10

An antistatic layer was formed in the same manner as in Example 1. Next, a hard coat layer was formed in the same manner as in Example 1, except that the thickness was changed to 12 µm, to thereby give an optical layered body.

The optical layered bodies obtained in the examples, the comparative examples, and the reference examples were evaluated for below-mentioned items. The optical layered bodies were evaluated immediately after they were produced (initial performance), after durability test (1) (storage at 80° C. for 500 hours), and after durability test (2) (exposure to xenon arc for 300 hours) for each item. With regard to the resistance of each optical layered body after the durability tests (1) and (2), the variation relative to the surface resistance immediately after the production (initial performance) represented by (surface resistance after the test)/(surface resistance before the test) was calculated. Table 1 shows the results of the optical layered bodies prepared in the examples. Table 2 shows the results of the optical layered bodies prepared in the comparative examples and the reference examples.

(Transmittance, Haze)

The transmittance (total light transmittance) and haze of each optical layered body were measured with a hazemeter (produced by Murakami Color Research Laboratory Co., Ltd., product number: HM-150) in accordance with JIS K-7361 (total light transmittance).

(Resistance)

The surface resistance of each optical layered body was measured with a HIRESTA-UP MCP-HT450 (produced by Mitsubishi Chemical Corporation, R probe, voltage application: 500V) (unit: Ω/□).

(Adhesion)

Each optical layered body was subjected to a cross-cut adhesion test. The ratio of the number of cuts remained on the substrate after peeling of a tape to the initial number (100) of cuts was evaluated based on the following criteria.
Good: 90/100 to 100/100
Acceptable: 50/100 to 89/100
Poor: 0/100 to 49/100

(Pencil Hardness)

The pencil hardness of the surface, where the hard coat layer was formed, of each optical layered body was determined by a pencil hardness evaluation method in accordance with JIS K5600-5-4 (1999) at a load of 4.9 N. The test was performed with test pencils (hardness: 2B to 3H) defined in JIS S-6006 after two-hour humidity control at a temperature of 25° C. and a relative humidity of 60%.

TABLE 1

|  |  | Example 1 | Example 2 | Example 3 | Example 4 | Example 5 | Example 6 | Example 7 | Example 8 |
|---|---|---|---|---|---|---|---|---|---|
| Initial performance | Haze (%) | 1.2 | 1.2 | 1.2 | 1.2 | 1.2 | 1.2 | 1.2 | 1.2 |
|  | Total light transmittance (%) | 89 | 89 | 89 | 89 | 89 | 89 | 89 | 89 |
|  | Resistance ($\Omega/\square$) | $3.0 \times 10^8$ | $3.0 \times 10^8$ | $3.0 \times 10^8$ | $3.0 \times 10^8$ | $3.0 \times 10^8$ | $3.0 \times 10^8$ | $3.0 \times 10^8$ | $3.0 \times 10^8$ |
|  | Adhesion | Good | Good | Good | Good | Good | Good | Good | Good |
|  | Pencil hardness | Good | Good | Good | Good | Good | Good | Good | Good |
| Durability After test (1) | Haze (%) | 1.2 | 1.2 | 1.2 | 1.2 | 1.2 | 1.2 | 1.2 | 1.2 |
|  | Total light transmittance (%) | 89 | 89 | 89 | 89 | 89 | 89 | 89 | 89 |
|  | Resistance ($\Omega/\square$) | $4.5 \times 10^8$ | $4.5 \times 10^8$ | $4.5 \times 10^8$ | $4.5 \times 10^8$ | $4.5 \times 10^8$ | $4.5 \times 10^8$ | $4.5 \times 10^8$ | $4.5 \times 10^8$ |
|  | Resistance Variation | 1.5 | 1.5 | 1.5 | 1.5 | 1.5 | 1.5 | 1.5 | 1.5 |
|  | Adhesion | Good | Good | Good | Good | Good | Good | Good | Good |
|  | Pencil hardness | Good | Good | Good | Good | Good | Good | Good | Good |
| Durability After test (2) | Haze (%) | 1.2 | 1.2 | 1.2 | 1.2 | 1.2 | 1.2 | 1.2 | 1.2 |
|  | Total light transmittance (%) | 89 | 89 | 89 | 89 | 89 | 89 | 89 | 89 |
|  | Resistance ($\Omega/\square$) | $5.0 \times 10^8$ | $5.5 \times 10^8$ | $3.5 \times 10^8$ | $5.0 \times 10^8$ | $5.0 \times 10^8$ | $5.0 \times 10^8$ | $5.0 \times 10^8$ | $5.0 \times 10^8$ |
|  | Resistance Variation | 1.7 | 1.8 | 1.2 | 1.7 | 1.7 | 1.7 | 1.7 | 1.7 |
|  | Adhesion | Good | Good | Good | Good | Good | Good | Good | Good |
|  | Pencil hardness | Good | Good | Good | Good | Good | Good | Good | Good |

|  |  | Example 9 | Example 10 | Example 11 | Example 12 | Example 13 | Example 14 |
|---|---|---|---|---|---|---|---|
| Initial performance | Haze (%) | 1.2 | 1.2 | 1.2 | 1.2 | 1.2 | 1.2 |
|  | Total light transmittance (%) | 90 | 88 | 90 | 88 | 89 | 89 |
|  | Resistance ($\Omega/\square$) | $5.0 \times 10^8$ | $2.0 \times 10^8$ | $5.0 \times 10^8$ | $2.0 \times 10^8$ | $2.0 \times 10^8$ | $5.0 \times 10^8$ |
|  | Adhesion | Good | Good | Good | Good | Good | Good |
|  | Pencil hardness | Good | Good | Good | Good | Good | Good |
| Durability After test (1) | Haze (%) | 1.2 | 1.2 | 1.2 | 1.2 | 1.2 | 1.2 |
|  | Total light transmittance (%) | 90 | 88 | 90 | 88 | 89 | 89 |
|  | Resistance ($\Omega/\square$) | $7.0 \times 10^8$ | $3.0 \times 10^8$ | $7.0 \times 10^8$ | $3.0 \times 10^8$ | $3.0 \times 10^8$ | $7.0 \times 10^8$ |
|  | Resistance Variation | 1.4 | 1.5 | 1.4 | 1.5 | 1.5 | 1.4 |
|  | Adhesion | Good | Good | Good | Good | Good | Good |
|  | Pencil hardness | Good | Good | Good | Good | Good | Good |
| Durability After test (2) | Haze (%) | 1.2 | 1.2 | 1.2 | 1.2 | 1.2 | 1.2 |
|  | Total light transmittance (%) | 90 | 88 | 90 | 88 | 89 | 89 |
|  | Resistance ($\Omega/\square$) | $7.5 \times 10^8$ | $3.5 \times 10^8$ | $7.5 \times 10^8$ | $3.5 \times 10^8$ | $3.5 \times 10^8$ | $7.5 \times 10^8$ |
|  | Resistance Variation | 1.5 | 1.8 | 1.5 | 1.8 | 1.8 | 1.5 |
|  | Adhesion | Good | Good | Good | Good | Good | Good |
|  | Pencil hardness | Good | Good | Good | Good | Good | Good |

TABLE 2

|  |  | Comparative Example 1 | Comparative Example 2 | Comparative Example 3 | Comparative Example 4 | Comparative Example 5 | Reference Example 1 | Reference Example 2 | Reference Example 3 |
|---|---|---|---|---|---|---|---|---|---|
| Initial performance | Haze (%) | 1.2 | 1.2 | 1.2 | 1.2 | 1.2 | 1.2 | 1.2 | 1.2 |
|  | Total light transmittance (%) | 89 | 89 | 89 | 89 | 89 | 89 | 89 | 89 |
|  | Resistance ($\Omega/\square$) | $3.0 \times 10^8$ | $3.0 \times 10^8$ | $3.0 \times 10^8$ | $3.0 \times 10^8$ | $3.0 \times 10^8$ | $3.0 \times 10^8$ | $3.0 \times 10^8$ | $3.0 \times 10^8$ |
|  | Adhesion | Good | Good | Good | Good | Good | Good | Good | Good |
|  | Pencil hardness | Good | Good | Good | Good | Good | Good | Poor | Poor |
| Durability After test (1) | Haze (%) | 1.2 | 1.2 | 1.2 | 1.2 | 1.2 | 1.2 | 1.2 | 1.2 |
|  | Total light transmittance (%) | 89 | 89 | 89 | 89 | 89 | 89 | 89 | 89 |
|  | Resistance ($\Omega/\square$) | $2.0 \times 10^8$ | $2.0 \times 10^8$ | $2.0 \times 10^8$ | $2.0 \times 10^8$ | $2.0 \times 10^8$ | $5.0 \times 10^8$ | $4.5 \times 10^8$ | $4.5 \times 10^8$ |
|  | Resistance Variation | 0.67 | 0.67 | 0.67 | 0.67 | 0.67 | 1.7 | 1.5 | 1.5 |
|  | Adhesion | Good | Good | Good | Good | Good | Good | Good | Good |
|  | Pencil hardness | Good | Good | Good | Good | Good | Good | Poor | Poor |
| Durability After test (2) | Haze (%) | 1.2 | 1.2 | 1.2 | 1.2 | 1.2 | 1.2 | 1.2 | 1.2 |
|  | Total light transmittance (%) | 89 | 89 | 89 | 89 | 89 | 89 | 89 | 89 |
|  | Resistance ($\Omega/\square$) | $0.6 \times 10^8$ | $0.5 \times 10^8$ | $1.0 \times 10^8$ | $0.8 \times 10^8$ | $1.0 \times 10^8$ | $7.5 \times 10^8$ | $5.0 \times 10^8$ | $5.0 \times 10^8$ |
|  | Resistance Variation | 0.20 | 0.17 | 0.33 | 0.27 | 0.33 | 2.5 | 1.7 | 1.7 |
|  | Adhesion | Good | Good | Good | Good | Good | Poor | Good | Good |
|  | Pencil hardness | Good | Good | Good | Good | Good | Good | Poor | Poor |

|  |  | Reference Example 4 | Reference Example 5 | Reference Example 6 | Reference Example 7 | Reference Example 8 | Reference Example 9 | Reference Example 10 |
|---|---|---|---|---|---|---|---|---|
| Initial performance | Haze (%) | 1.2 | 1.2 | 1.2 | 1.2 | 1.2 | 1.2 | 1.2 |
|  | Total light transmittance (%) | 89 | 90 | 85 | 90 | 85 | 89 | 89 |
|  | Resistance ($\Omega/\square$) | $3.0 \times 10^8$ | Over | $1.0 \times 10^8$ | Over | $1.0 \times 10^8$ | $1.0 \times 10^8$ | Over |
|  | Adhesion | Good | Good | Acceptable | Good | Good | Good | Good |
|  | Pencil hardness | Poor | Good | Good | Good | Good | Poor | Good |

TABLE 2-continued

|  |  |  |  |  |  |  |  |  |
|---|---|---|---|---|---|---|---|---|
| Durability After test (1) | Haze (%) | 1.2 | 1.2 | 1.2 | 1.2 | 1.2 | 1.2 | 1.2 |
|  | Total light transmittance (%) | 89 | 90 | 85 | 90 | 85 | 89 | 89 |
|  | Resistance (Ω/□) | $4.5 \times 10^8$ | Over | $1.5 \times 10^8$ | Over | $2.0 \times 10^8$ | $2.0 \times 10^8$ | Over |
|  | Resistance Variation | 1.5 | Over | 1.5 | Over | 2.0 | 2.0 | Over |
|  | Adhesion | Good | Good | Poor | Good | Good | Good | Good |
|  | Pencil hardness | Poor | Good | Good | Good | Good | Poor | Good |
| Durability After test (2) | Haze (%) | 1.2 | 1.2 | 1.2 | 1.2 | 1.2 | 1.2 | 1.2 |
|  | Total light transmittance (%) | 89 | 90 | 85 | 90 | 85 | 89 | 89 |
|  | Resistance (Ω/□) | $5.0 \times 10^8$ | Over | $1.5 \times 10^8$ | Over | $2.0 \times 10^8$ | $2.0 \times 10^8$ | Over |
|  | Resistance Variation | 1.7 | Over | 1.5 | Over | 2.0 | 2.0 | Over |
|  | Adhesion | Good | Good | Poor | Good | Good | Good | Good |
|  | Pencil hardness | Poor | Good | Good | Good | Good | Poor | Good |

As shown in Table 1, the optical layered bodies prepared in the examples showed little change in the surface resistance before and after the durability tests, and were extremely high in the stability of the antistatic performance. They were also excellent in the evaluations of the haze, total light transmittance, adhesion, and pencil hardness.

In contrast, as shown in Table 2, the optical layered bodies prepared in the comparative examples showed large change in the surface resistance before and after durability test (2), and had poor stability of the antistatic performance.

The optical layered body prepared in Reference Example 5 in which the antistatic layer contained a small amount of the conductive fine particles, the optical layered body prepared in Reference Example 7 in which the antistatic layer was too thin, and the optical layered body prepared in Reference Example 10 in which the hard coat layer was too thick all had excessively high surface resistance and had insufficient antistatic properties. Optical layered bodies prepared in other reference examples showed little change in the surface resistance before and after the durability tests and were extremely high in the stability of the antistatic performance. However, none of them was excellent in all the evaluations of the haze, total light transmittance, adhesion, and pencil hardness.

INDUSTRIAL APPLICABILITY

The optical layered body of the present invention can be suitably used for, for example, displays such as cathode ray tube (CRT) display devices, liquid crystal displays (LCD), plasma display panels (PDP), electroluminescence displays (ELD), touch panels, or electronic paper, and can be particularly suitably used for high definition image displays.

The invention claimed is:

1. A liquid crystal display device, comprising:
a transparent display comprising a liquid crystal display element and a polarizer on an image display element side of the liquid crystal layer;
a lighting system for illuminating the liquid crystal display element from a back side; and
an optical layered body comprising:
a light-transmitting substrate; and
an antistatic layer on one face of the light-transmitting substrate,
wherein the optical layered body is on an image display side relative to the polarizer,
the antistatic layer is formed from a composition containing conductive fine particles, a resin component, and a solvent,
the molecules of the resin component have no reactive functional group, and the resin component is soluble in the solvent and compatible with the conductive fine particles, and
the conductive fine particles are in a form of chain-like or needle-like aggregates that have a configuration where at least two pieces of the conductive fine particles are connected to form a linear or branched aggregate.

2. The liquid crystal display device according to claim 1, wherein, when a durability test (1) of exposing the optical layered body to a temperature of 80° C. for 500 hours or a durability test (2) of irradiating the optical layered body with xenon arc for 300 hours is conducted, a variation in surface resistance observed after the durability test (1) or the durability test (2), represented by (surface resistance after the test)/(surface resistance before the test), is within a range of 0.5 to 2.0.

3. The liquid crystal display device according to claim 1, wherein the resin component has a weight average molecular weight of 20,000 to 200,000, and a glass transition temperature of 80 to 120° C.

4. The liquid crystal display device according to claim 1, wherein the resin component is at least one selected from the group consisting of acrylic resins, cellulosic resins, urethane resins, vinyl chloride resins, polyester resins, polyolefin resins, polycarbonate, nylons, polystyrene, and ABS resins.

5. The liquid crystal display device according to claim 1, wherein the conductive fine particles are made of antimony-doped tin oxide (ATO), the resin component comprises polymethyl methacrylate, and the solvent comprises propylene glycol monomethyl ether.

6. The liquid crystal display device according to claim 1, wherein the optical layered body further comprises a hard coat layer arranged on a face on an opposite side of the antistatic layer with respect to the light-transmitting substrate.

7. The liquid crystal display device according to claim 6, wherein the hard coat layer comprises the same resin component as the antistatic layer.

8. The liquid crystal display device according to claim 6, wherein the hard coat layer comprises electrically conductive fine particles.

9. The liquid crystal display device according to claim 6, wherein the hard coat layer contains an ultraviolet ray absorbent.

10. The liquid crystal display device according to claim 9, wherein the amount of the ultraviolet ray absorbent is 3 to 15% by mass in the hard coat layer.

* * * * *